United States Patent
Shimizu (12)

(10) Patent No.: US 6,803,934 B2
(45) Date of Patent: Oct. 12, 2004

(54) EXPOSURE UNIT SUPPORT HAVING A PRIMARY RESONANCE FREQUENCY HIGHER THAN THAT OF A MIRROR IN THE EXPOSURE UNIT

(75) Inventor: Akihiro Shimizu, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 09/900,880

(22) Filed: Jul. 10, 2001

(65) Prior Publication Data

US 2002/0021457 A1 Feb. 21, 2002

(30) Foreign Application Priority Data

Jul. 12, 2000 (JP) .......................................... 2000-210836

(51) Int. Cl.[7] .............................................. G03G 15/04
(52) U.S. Cl. ........................ 347/138; 347/129; 347/242
(58) Field of Search .............................. 347/129, 138, 347/152, 263, 257, 242; 377/177, 118; 359/198

(56) References Cited

U.S. PATENT DOCUMENTS

| 5,212,523 | A | * | 5/1993 | Ogaiwara et al. ............ 399/155 |
| 5,585,627 | A | * | 12/1996 | Akutsu et al. ............... 250/234 |
| 5,760,818 | A | * | 6/1998 | Hinton et al. ................ 347/263 |
| 6,121,985 | A | * | 9/2000 | Terada et al. ................ 347/138 |
| 6,195,190 | B1 | * | 2/2001 | Tachibe et al. .............. 359/216 |
| 6,483,530 | B2 | * | 11/2002 | Wilson ......................... 347/263 |
| 6,621,608 | B2 | * | 9/2003 | Iimura ......................... 359/196 |

* cited by examiner

Primary Examiner—Andrew H. Hirshfeld
Assistant Examiner—Leo T. Hinze
(74) Attorney, Agent, or Firm—Fitzpatrick, Cella, Harper & Scinto

(57) ABSTRACT

An image forming apparatus includes a supporting member extended between first and second frames and supporting an exposure unit, wherein the primary resonance frequency of the supporting member is higher than that of a mirror provided in the exposure unit, whereby the supporting member is prevented from being caused to resonate by oscillation generated in the driving system of the apparatus main body to thereby prevent the mirror from oscillating.

7 Claims, 5 Drawing Sheets

(OSCILLATING WAVEFORM OF TURN-BACK MIRROR IN STAY STRUCTURE OF CONVENTIONAL ART)

(OSCILLATING WAVEFORM OF TURN-BACK MIRROR IN STAY STRUCTURE OF THE INVENTION)

EXPOSURE UNIT SUPPORT HAVING A PRIMARY RESONANCE FREQUENCY HIGHER THAN THAT OF A MIRROR IN THE EXPOSURE UNIT

BACKGROUND OF THE INVENTION

1. Field of the Invention

The present invention relates to an image forming apparatus, such as a copying machine, a facsimile apparatus, or a printer.

2. Description of the Related Art

Conventionally, an apparatus having a photosensitive member or the like includes a driving system having a driving motor, and resonance is caused by the oscillation as a result of the driving of this driving system. When the oscillation due to this resonance is transmitted to the exposure unit to cause the mirror to oscillate, the image will be blurred.

The primary resonance frequency of the mirror is higher than the frequency of the oscillation generated in the driving system, so that the mirror is free from resonance. However, a member extended between first and second frames is very subject to the resonance as a result of the driving of the driving system. When the member supporting the exposure unit resonates, the mirror is influenced by this resonance and oscillates.

The frequency of the driving system varies from one apparatus to another and depends on the driving condition, so that it is difficult to prevent the resonance from being transmitted to the exposure unit.

FIG. 5 shows a conventional apparatus. Numeral 304 indicates a flat exposure-unit supporting member. In this kind of apparatus, to cope with the above problem, a rubber member or the like is provided between the exposure unit 303 and the supporting member 304, or a diaphragm-shaped bearing surface for reinforcement is provided in the exposure unit mounting portion, thereby reducing the influence of the resonance of the supporting member.

If it is still impossible to reduce the influence of the resonance of the supporting member, the oscillation is suppressed by, for example, attaching a damping member to the exposure unit.

However, placing a damping member or the like between the exposure unit and the supporting member results in an unstable positioning of the exposure unit, a deterioration in the material of the damping member due to the use of long duration, etc., and the cost of solving these problems is rather high.

SUMMARY OF THE INVENTION

It is an object of the present invention to provide an image forming apparatus capable of reliably preventing the supporting member from being caused to resonate by the driving system by making the primary resonance frequency of the supporting member extending between a first frame and a second frame and supporting the exposure unit higher than that of the mirror in the exposure unit.

Another object of the present invention is to provide an image forming apparatus comprising:

a photosensitive member;

charging means for charging the photosensitive member;

an exposure unit for exposing the photosensitive member charged by the charging means to image information light to form an electrostatic latent image;

developing means for developing the electrostatic latent image on the photosensitive member;

transfer means for transferring the developed image on the photosensitive member to a transferring material;

a first frame and a second frame; and a supporting member extending between the first and second frames and supporting the exposure unit, wherein the supporting member has a primary resonance frequency higher than that of a mirror in the exposure unit.

Further objects of the present invention will become apparent from the following description.

BRIEF DESCRIPTION OF THE DRAWINGS

FIGS. 4A and 4B are diagrams comparing the conventional art with the present invention with respect to the mirror oscillating waveform, of which FIG. 4A is a diagram showing the oscillating waveform of a turn-back mirror in a conventional stay structure, and FIG. 4B is a diagram showing the oscillating waveform of a turn-back mirror in a stay structure according to the present invention.

DESCRIPTION OF THE PREFERRED EMBODIMENTS

A preferred embodiment of this invention will now be described in detail with reference to the drawings.

Figure 1:
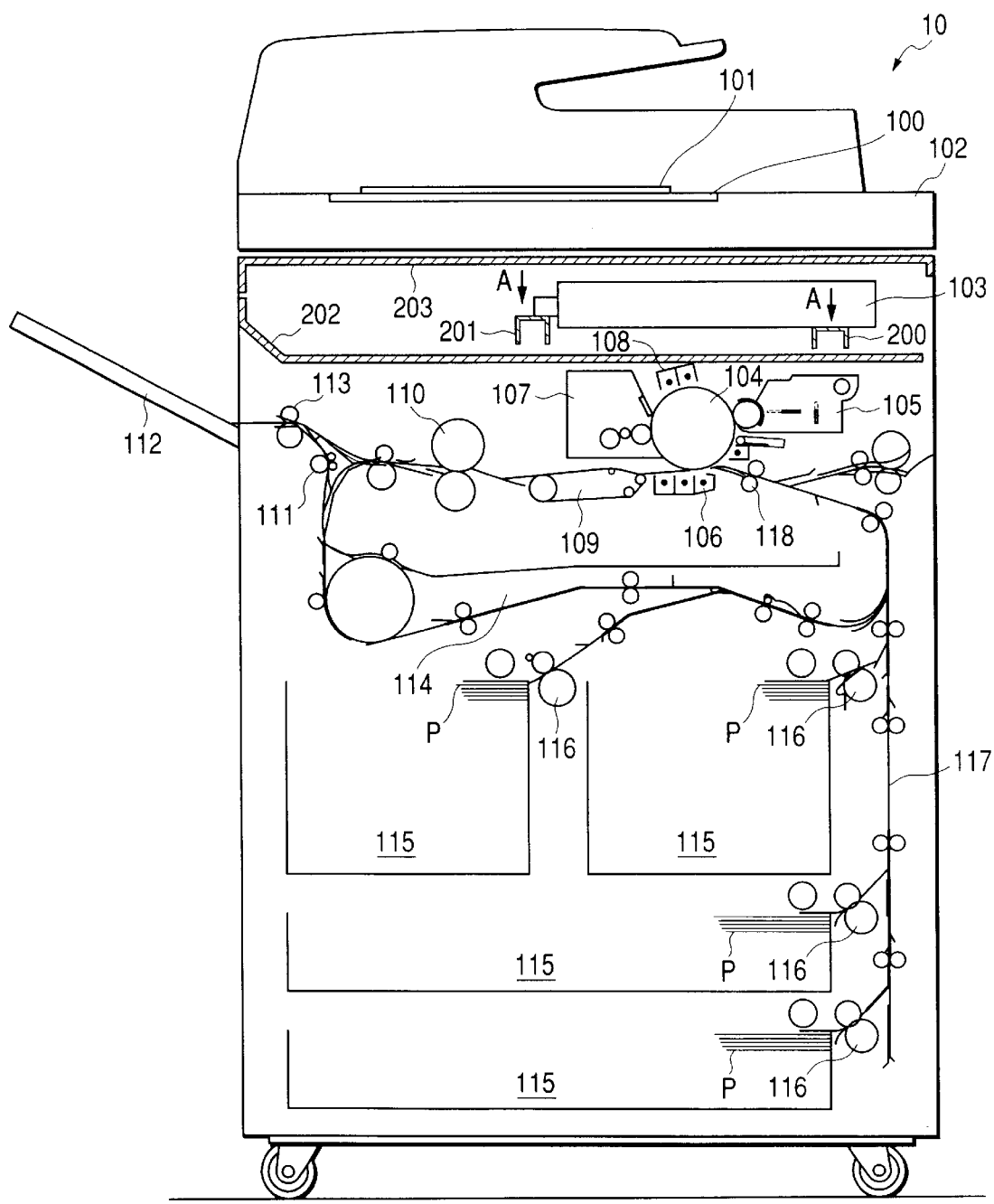
FIG. 1 is a schematic sectional view of an image forming apparatus according to an embodiment of the present invention.
Figure 2:
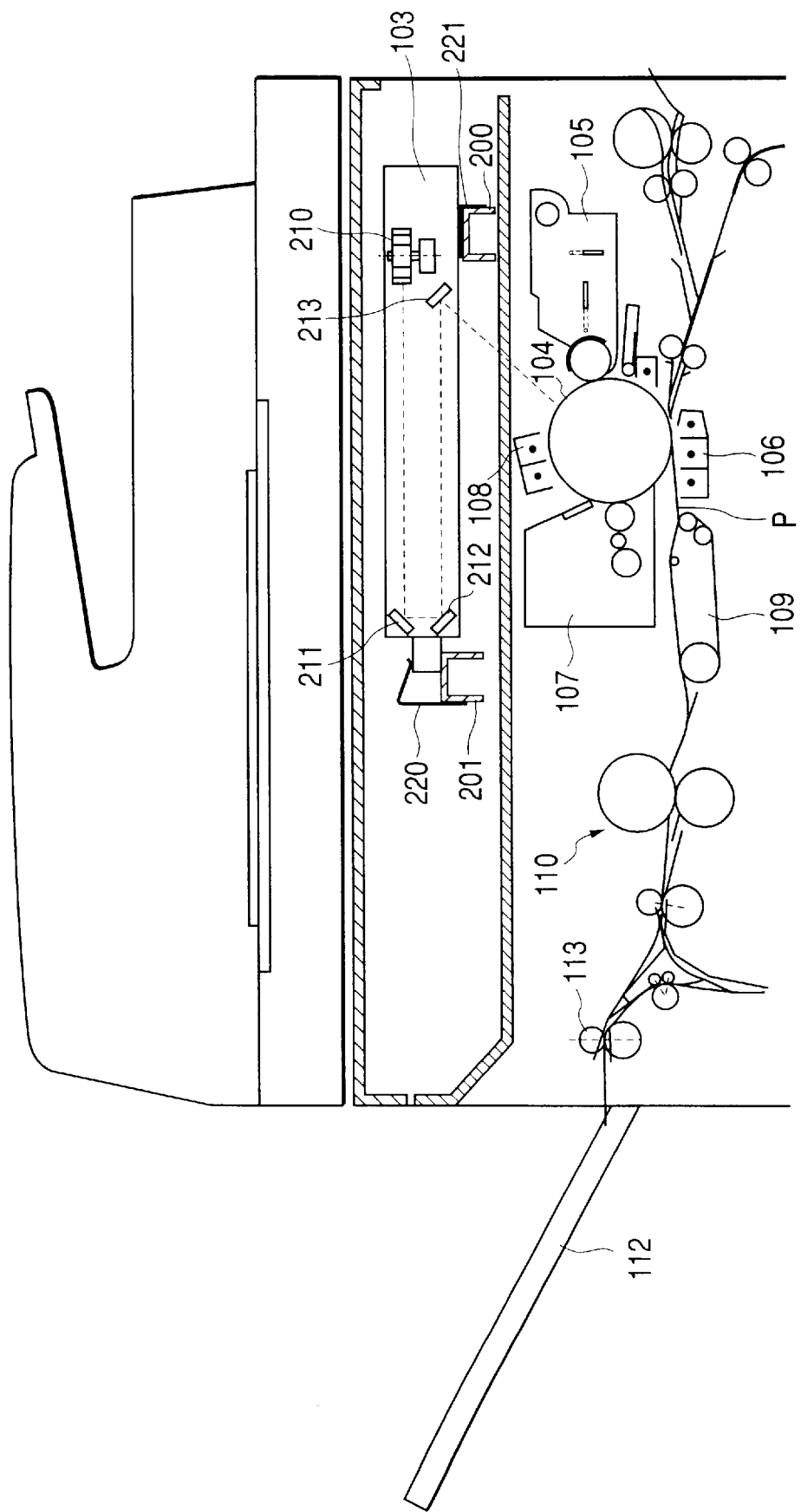
FIG. 2 is a diagram schematically showing the interior of an exposure unit.
Figure 3:
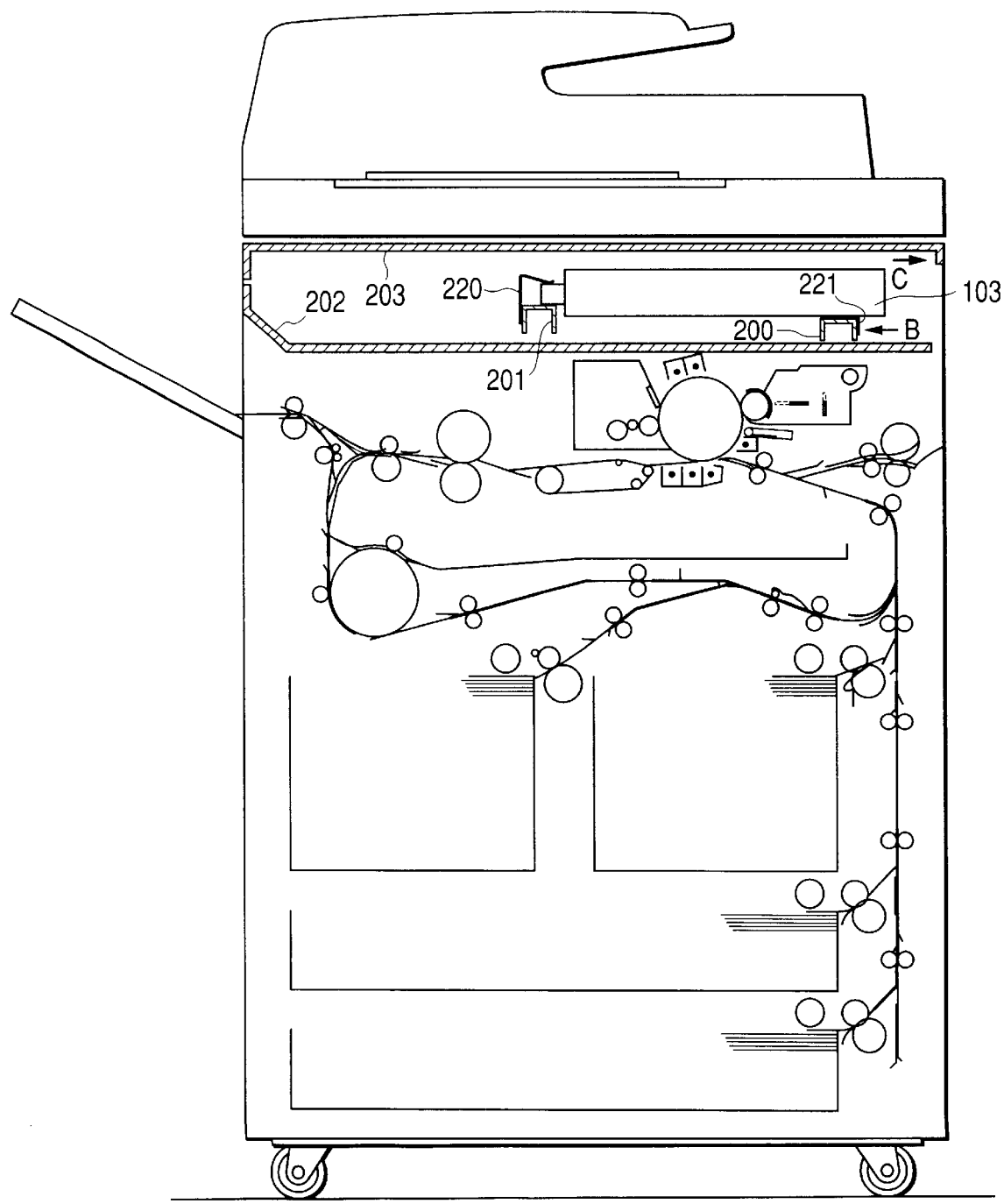
FIG. 3 is a diagram showing a partial modification of the image forming apparatus shown in FIG. 1.
Figure 4A:
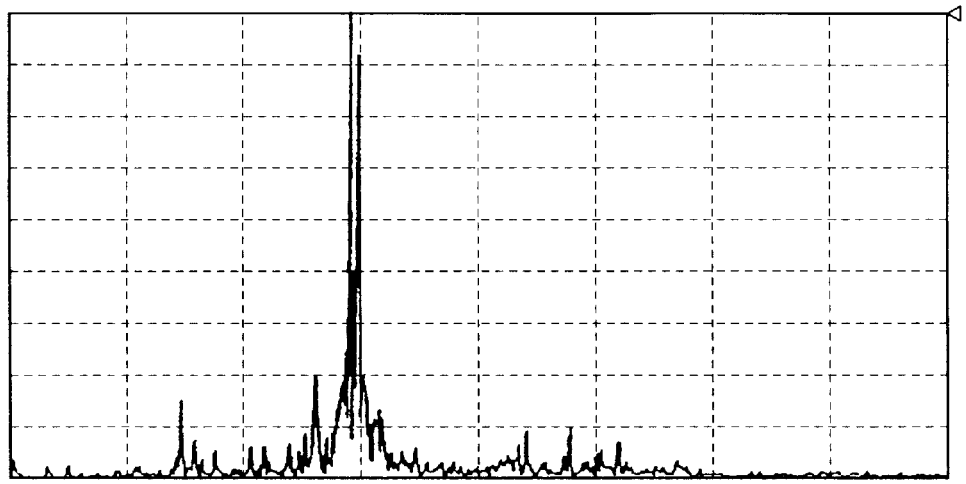
Figure 4B:
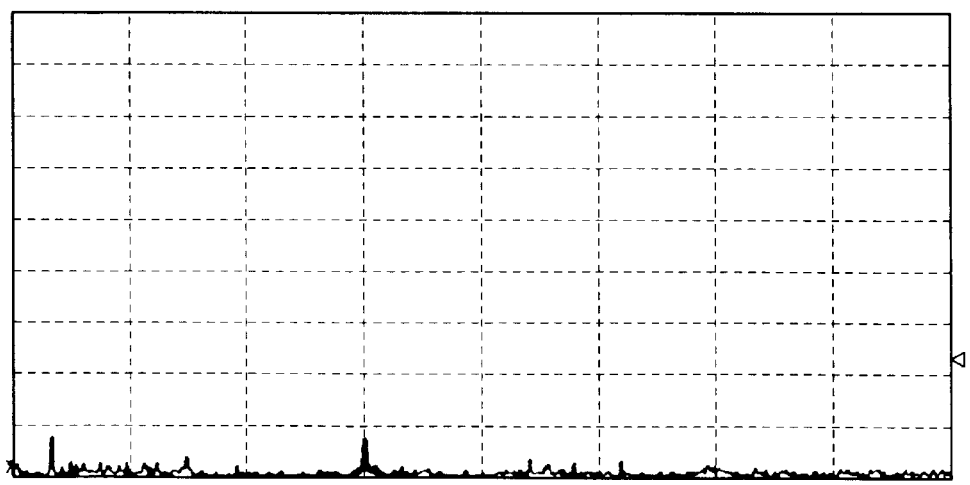
Figure 5:
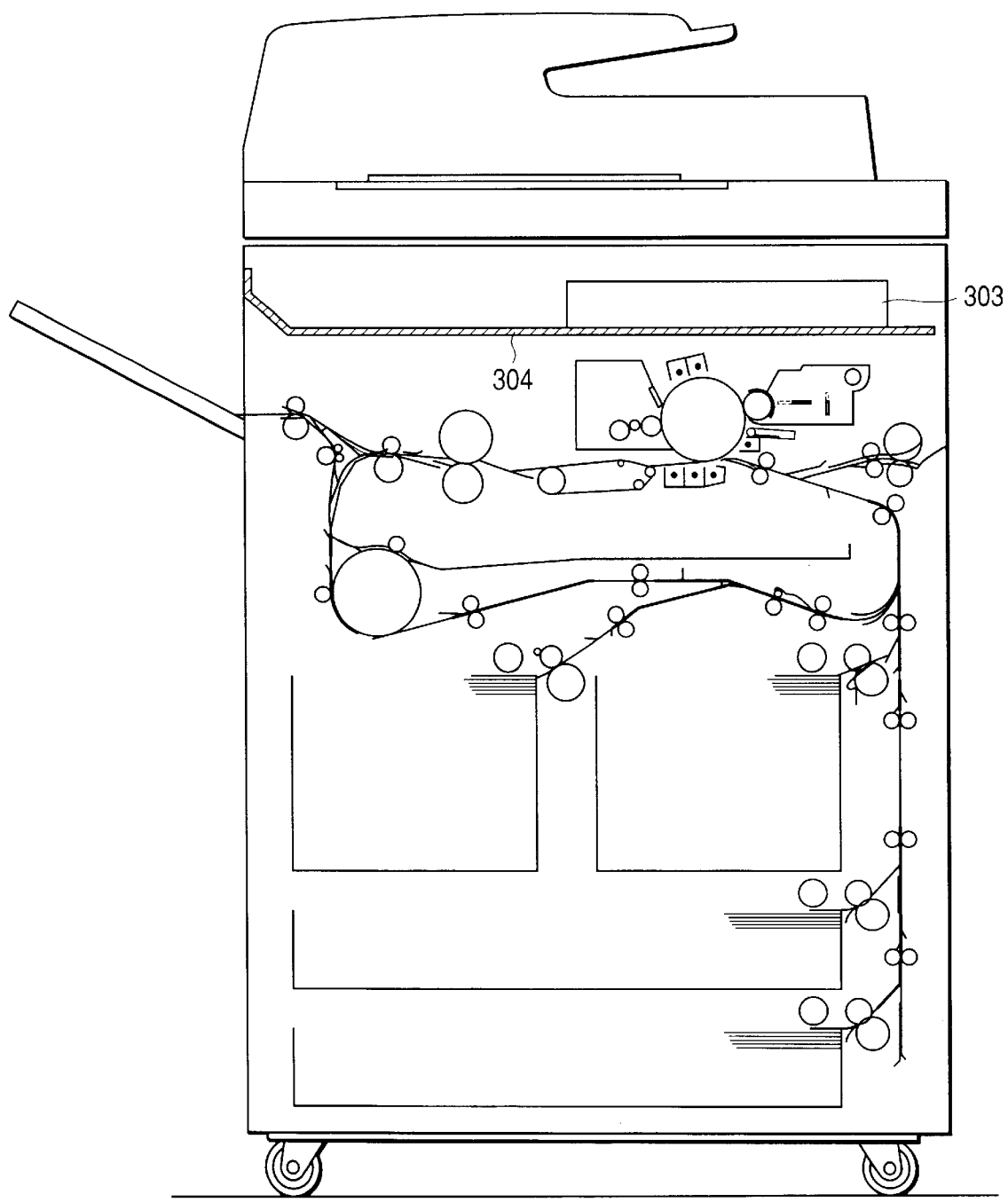
FIG. 5 is a schematic sectional view of a conventional image forming apparatus.

An image forming apparatus according to an embodiment of the present invention will be described with reference to FIGS. 1, 2, 3, 4A and 4B. FIG. 1 is a schematic sectional view of an image forming apparatus according to an embodiment of the present invention; FIG. 2 is a partial enlarged view thereof; FIG. 3 is a diagram showing a partial modification of the image forming apparatus shown in FIG. 1; and FIGS. 4A and 4B are diagrams comparing the conventional art with the present invention with respect to mirror oscillating waveform.

In FIG. 1, an image forming apparatus 10 includes an original glass stand 100 on which an original 101 is placed, and a reader unit 102 for reading the image information of the original 101.

An exposure unit 103 applies light containing the image information of the original 101 or other image information to a predetermined position on the surface of a drum 104 serving as an image bearing member.

The exposure unit 103 is equipped with a laser beam source which is turned on and off by an electric signal obtained by processing and controlling the image information obtained by the reader unit 102 or other image information through an image processing device (not shown). Further, in an optical path guiding a laser beam from the laser beam source to the drum 104, there are provided a plurality of optical components, that is, a plurality of mirrors 211, 212, and 213 for reflecting the laser beam, a polygon mirror 210 allowing scanning with the laser beam, a plurality of optical members (various types of lenses and the like) for optically performing enlargement, correction, etc.

Further, in the periphery of the drum 104, there are arranged a developing device 105 for supplying toner to the drum 104 to visualize the electrostatic latent image on the drum, a transfer and separation charging device 106 having a separating portion for separating from the drum 104 a sheet P electrostatically adhering to the drum 104, with the toner image transferred to the sheet P, a cleaning device 107 for removing the toner remaining on the drum 104 without being transferred to the sheet P, and a pre-exposure device 108 for erasing the latent image remaining on the drum 104.

Further, there is arranged a transporting device 109 for transporting the sheet P to which the toner image has been transferred from the drum 104 to a fixing device 110.

Further, there is provided a delivery sheet surface reversing device 111 for performing control to determine whether to deliver the sheet P from the fixing device 110 to a delivery tray 112 outside the apparatus by a delivery roller 113 or to transport the sheet P to a re-feeding device 114 for re-feeding the sheet P to the drum 104 when making a two-sided copy or a multi-copy.

Further, there is provided a sheet feed cassette 115 in which sheets P are stacked together in storage.

Next, the operation of the image forming apparatus, constructed as described above, will be sequentially described.

First, when the user depresses a copy start button (not shown), the sheets P stacked together in the sheet feed cassette 115 are transported one by one to a vertical path transporting portion 117 by a feeding device 116, and conveyed to a registration roller 118.

Next, scanning is started by the reader unit 102 to convert the image information of the original 101 to an electric signal, and light containing information on the original image is applied to the surface of the drum 104 by the exposure unit 103 through an image processing device (not shown) to record the image. It is also possible to perform this operation on the basis of image information input from an external device.

Further, in synchronism with this operation, the registration roller 118 starts to transport the sheets P.

At this time, the electrostatic latent image, which constitutes the image information of the original 101 recorded on the drum 104, is turned into a toner image by the developing device 105, and this toner image is transferred to the sheet P by the transfer and separation device 106 and transported by the transporting device 109. After the toner image has been fixed to the sheet P by the fixing device 110, when a one-side copy is to be made, the sheet P is transported to the delivery roller 113 by the delivery sheet surface reversing device 111 and is then discharged onto the delivery tray 112 outside the apparatus.

When a two-sided copy or a multi-copy is to be made, the sheet P, to which a toner image has been fixed by the fixing device 110, is transported to the drum 104 again by the re-feeding device 114, controlled by the delivery sheet surface reversing device 111, and a toner image is again transferred to the sheet before the sheet is discharged onto the delivery tray 112 outside the apparatus by way of the transporting device 109, the fixing device 110, the delivery sheet surface reversing device 111, and the delivery roller 113.

The exposure unit 103 is mounted to supporting members 200 and 201 extended between a first frame constituting a front side plate and a second frame constituting a rear side plate.

Inside the exposure unit 103, turn-back mirrors 211, 212, and 213, extending in the axial direction of the drum 104, are arranged and fastened to the exposure unit 103 by means of several screws. Thus, they are subject to the influence of oscillation. The primary resonance frequency of the turn-back mirrors 211 through 213 ranges from 270 to 300 Hz, and the frequency of the oscillation of the driving system ranges from approximately 100 to 300 Hz, so that no resonance is caused by the oscillation of the driving system. However, when the supporting members 200 and 201 resonate, the turn-back mirrors 211 through 213 will also be affected.

In view of this, the primary resonance frequency of the supporting members 200 and 201 is set to the range of 350 to 400 Hz, which is higher than the primary resonance frequency of the turn-back mirrors 211 through 213. Thus, it is possible to reliably prevent the supporting members 200 and 201 from being caused to resonate by the oscillation of the driving system.

If a high-frequency oscillation of 350 to 400 Hz is applied to the supporting members 200 and 201, it is an oscillation of high frequency and small amplitude, so that the image quality is not affected to such a degree as to be discernible to the naked eye.

In this way, the setting of primary resonance frequency is made mainly according to the sectional configuration of the supporting members and, further, according to the material of the supporting members, etc.

The exposure unit 103 is fastened to each of the supporting members 200 and 201 by using two screws, respectively. Though not shown, the fastening is effected in the direction indicated by the arrow A of FIG. 1.

It is also possible to adopt a supporting method as shown in FIG. 2, which will be described below. In this method, the supporting effect of the stay 201 is obtained not by fastening it by screws at two positions but by the resilient force of plate springs 220 fastened to the supporting member 201 by screws or the like (In this example, in addition to the plate spring 220 shown in FIG. 2, another plate spring of the same configuration (not shown) is provided behind it). Further, mounting members 221 are provided on the exposure unit 103 (In this example, in addition to the mounting member 221 shown in FIG. 2, another mounting member of the same configuration (not shown) is provided behind it), and fastened to the supporting member 200 by means of screws in the direction indicated by the arrow B of FIG. 3. In this supporting method, by releasing the portion fastened by screws, the optical unit 103 is allowed to freely move in the direction indicated by the arrow C of FIG. 3.

Further, below the exposure unit 103 and the supporting members 200 and 201, a flat stay 202, which is a reinforcing member consisting of a flat plate, is arranged so as to be spaced apart from the supporting members 200 and 201 by a minute distance. Further, also above the supporting members 200 and 201, a stay 203 is arranged.

The supporting members 200 and 201, the flat stay 202, and the stay 203 are fastened by screws and welding to a first frame (front side plate) and a second frame (rear side plate) constituting the frame body of the apparatus main body.

Due to the above-described construction of the exposure unit supporting members and, in particular, due to the arrangement in which the primary resonance frequency of the supporting members 200 and 201 is higher than the primary resonance frequency of the turn-back mirrors 211 through 213, the supporting members 200 and 201 are prevented from resonating as a result of the oscillation of the driving system of the apparatus main body, thereby reducing the adverse influence on the turn-back mirrors 211 through 213.

FIGS. 4A and 4B respectively show the oscillating waveforms of the turn-back mirror portion provided in the exposure unit in the case of the exposure unit supporting member construction in a conventional image forming apparatus and in the case of the supporting member construction in the image forming apparatus of this embodiment.

As is apparent from FIG. 4B, the exposure unit supporting member construction of the above embodiment of the present invention makes it possible to reduce the oscillation propagated to the exposure unit and the turn-back mirror portion.

Thus, it is possible to achieve an improvement in terms of image quality.

Further, since the exposure unit 103 is supported by the supporting members 200 and 201 consisting of simple members, without intervention of any rubber member or the like, it is possible to eliminate factors leading to an increase in cost.

It is to be noted that, unless otherwise specified, the dimensions, materials, configurations, and positional relationship of the components of this embodiment should not be construed restrictively.

What is claimed is:

1. An image forming apparatus comprising:
    a photosensitive member;
    charging means for charging the photosensitive member;
    an exposure unit for exposing the photosensitive member charged by the charging means to image information light to form an electrostatic latent image;
    developing means for developing the electrostatic latent image on the photosensitive member;
    transfer means for transferring a developed image on the photosensitive member to a transferring material;
    a first frame and a second frame; and
    a supporting member extended between the first and second frames and supporting the exposure unit,
    wherein the supporting member has a primary resonance frequency higher than that of a mirror in the exposure unit.

2. An image forming apparatus according to claim 1, wherein the first frame is a side plate provided on a front side of the image forming apparatus, and wherein the second frame is a side plate provided on a rear side of the image forming apparatus.

3. An image forming apparatus according to claim 1, further comprising fixing means for fixing the developed image, transferred to the transferring material, to the transferring material, wherein the first and second frames support the photosensitive member and the fixing means.

4. An image forming apparatus according to claim 1, wherein the mirror reflects image information light toward the photosensitive member.

5. An image forming apparatus according to claim 1, wherein the exposure unit has a laser beam source emitting a laser beam and scanning means for performing scanning with the laser beam emitted from the laser beam source.

6. An image forming apparatus according to claim 1, wherein the supporting member is formed of one of the following metals: aluminum and stainless steel.

7. An image forming apparatus according to claim 1, wherein the supporting member has a U-shaped sectional configuration.

* * * * *